US006758318B2

(12) United States Patent
Weaver

(10) Patent No.: US 6,758,318 B2
(45) Date of Patent: Jul. 6, 2004

(54) CONTINUOUSLY MOVING SIDEWALK PEDESTRIAN TRANSPORT SYSTEM

(76) Inventor: Eric R. Weaver, 2008 E. Patterson St., Tampa, FL (US) 33610

( * ) Notice: Subject to any disclaimer, the term of this patent is extended or adjusted under 35 U.S.C. 154(b) by 0 days.

(21) Appl. No.: 10/655,908

(22) Filed: Sep. 5, 2003

(65) Prior Publication Data

US 2004/0045789 A1 Mar. 11, 2004

Related U.S. Application Data

(60) Provisional application No. 60/408,706, filed on Sep. 6, 2002.

(51) Int. Cl.[7] ................................................ B65G 15/00
(52) U.S. Cl. ....................................... 198/321; 198/326
(58) Field of Search ................................. 198/321, 326, 198/330; 104/23.2, 154

(56) References Cited

U.S. PATENT DOCUMENTS 3,760,738 A * 9/1973 Giraud ....................... 198/321
3,828,687 A * 8/1974 McKeen ..................... 104/154
4,299,321 A * 11/1981 Hermawan .................. 198/321
6,170,632 B1 * 1/2001 Shimura et al. ............ 198/321

* cited by examiner

*Primary Examiner*—James R. Bidwell
(74) *Attorney, Agent, or Firm*—Larson & Larson, PA; James E. Larson

(57) ABSTRACT

A continuously moving sidewalk pedestrian transport system includes a railway loop having a pair of continuous parallel rails connected by a plurality of elongated tie rods disposed upon a ground surface. An area defined between the pair of rails and ground surface is hydraulically sealed to prevent fluid placed between the rails from escaping. A pedestrian pathway is mounted on top of the rails to contain the fluid under pressure. The pedestrian pathway is mounted such that it can move along the railway loop. A pedestrian walking upright can step onto the moving pathway and be transported along the railway loop. When the pedestrian reaches a desired location along the loop she may step off of the moving pathway to continue walking to her desired location.

20 Claims, 5 Drawing Sheets

CONTINUOUSLY MOVING SIDEWALK PEDESTRIAN TRANSPORT SYSTEM

PRIOR APPLICATIONS

This is a non-provisional application which bases priority on provisional patent application 60/408,706, filed Sep. 6, 2002.

BACKGROUND OF THE INVENTION

1. Field of the Invention

This invention relates to a pedestrian transport system. More particularly, it relates to a continuously moving sidewalk type mass transport system with a hydraulically levitated pathway loop for supporting and transporting pedestrians.

2. Background of the Prior Art

Pedestrian transport systems are known in the prior art. Their use has escalated over the years and are typically used in environments that require pedestrians to move great distances by foot from one point to another. For instance, in large airports, continuously moving transport systems are widely used to move travelers from one terminal to another or front the departure and arrival gates to the baggage claim area, parking lots and the ticket counters. These transport systems are typically electrically powered and have mechanical motors which turn rotors or gears which move a tarp like walkway along a set of tracks.

U.S. Pat. No. 6,170,632 is drawn to a moving walkway which utilizes individual pallets, which are arranged for rounding or circulation on annular rails. Screw rods are installed on the rails to move the pallets with their moving rollers. A major disadvantage of this prior art system is the speed and efficiency due to the rolling components which creates friction.

U.S. Pat. No. 4,509,429 discloses a transportation system utilizing a stretchable train of cars and stretchable band conveyors. This prior art system employs independent load carrying components connected together and driven by an endless screw positioned along the closed loop path.

U.S. Pat. No. 4,964,496 discloses a mass transit system. This prior art mass-transit system includes an endless flexible member driven by revolving platforms at a constant speed to carry cars, which together form an endless train. This invention requires cars to carry the pedestrians which is makes it more expensive and complicated to install and to maintain.

U.S. Pat. No. 5,571,254 illustrates a speed variable moving sidewalk. This prior art system utilizes an endless circulating path as a moving sidewalk for conveying passengers. However, this includes a large number of tread boards moving along the circulating path. Each tread board moves independently and is guided by guide rails and has hooks on an underside for engaging shafts of a driving chain. Tread boards, hooks or chains have to be driven which creates additional friction and cost.

U.S. Pat. No. 5,044,485 discloses a moving walkway having at least one beltway section that has two spaced small diameter rollers defining the ends of the beltway section, a drive unit and a thin flexible continuous slider belt.

U.S. Pat. No. 5,341,683 discloses a moving walkway which utilizes a circulating endless belt. However, successive modules are required to engage multiple rollers for creating the motion for the moving walkway. This complicates the design and makes the walkway more inefficient.

U.S. Pat. No. 5,538,124 discloses yet another moving walkway including at least one flat slider belt entrained around rollers and a termination plate at the discharge end of the belt.

An improved walkway system is clearly needed. The system should not be limited to indoor environments and in a preferred embodiment be a continuously moving loop which can be employed in an outdoor environment. Such a walkway would greatly benefit a pre-designed or preplanned town wherein the continuously moving walkway could be conveniently located such that all members of the town could easily utilize the walkway to transport themselves from their respective homes to other parts of the town including stores, restaurants, schools, workplaces and other transportation systems, such as train stations, bus stops and airports. Such a system would greatly reduce the need for using gas combustion type vehicles in the town as well as alleviate the need for an extensive public transportation system where the transport walkway system is conveniently employed.

SUMMARY OF THE INVENTION

I have invented an improved sidewalk pedestrian transport system. My system is continuously moving and is used to transport pedestrians from their respective homes and workplaces to other parts of the town.

The transport system of the present invention uses a standard railway loop. Individual railroad tracks of the railway loop utilize parallel disposed steel rails and are connected by steel or wood railroad ties supported by a compressed roadbed of stones. For the transport systems of the present invention, the railway loop is separated from all existing locomotive traffic and normal railway use and is solely used for the transportation of pedestrians. Nothing herein limits the use of a tracked laid specifically for the transport system of the present invention.

The area of the roadbed between the steel rails is hydraulically sealed to provide for the suspension of water to the height of the steel rails. A liquid sealant is used which dries to form a water retention surface within the span between the steel rails throughout the separate railway loop along a top portion of the railroad ties. A pedestrian pathway is mounted across the top of the steel rails to provide for the flow of water underneath the pathway but above the water retention surface. A set of spaced cup members having an open front end and a closed back end are located along a bottom surface of the pedestrian pathway. The pathway has a set of opposed outer distal edges which wrap around a top and side surface of the rails. A bead is provided along bottom portions of each outer distal side edge for communicating with a groove formed in each rail thereby assisting in the movement of the pathway along the rails.

The pathway is a single continuous loop, superimposed on the entire railway loop. The mounting is such that a water flow underneath can sustain a pressure flow while allowing the pathway to move along the loop without the loss of any water. The pressure flow is sustained from a power source adjacent to the railway loop. The motion of the pathway is caused by the force of the water beneath it and supplemental mechanical motion of the pathway is provided by the adjacent power source. The cup members assist in moving the pedestrian pathway along the direction of the water flow by capturing water therein.

In this preferred embodiment, a pedestrian can step onto the moving pathway and move there along without expending any additional energy by physically walking. The pedestrian can now easily be transported from one location along the railway loop to another location without the need or use of any other form of transportation.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
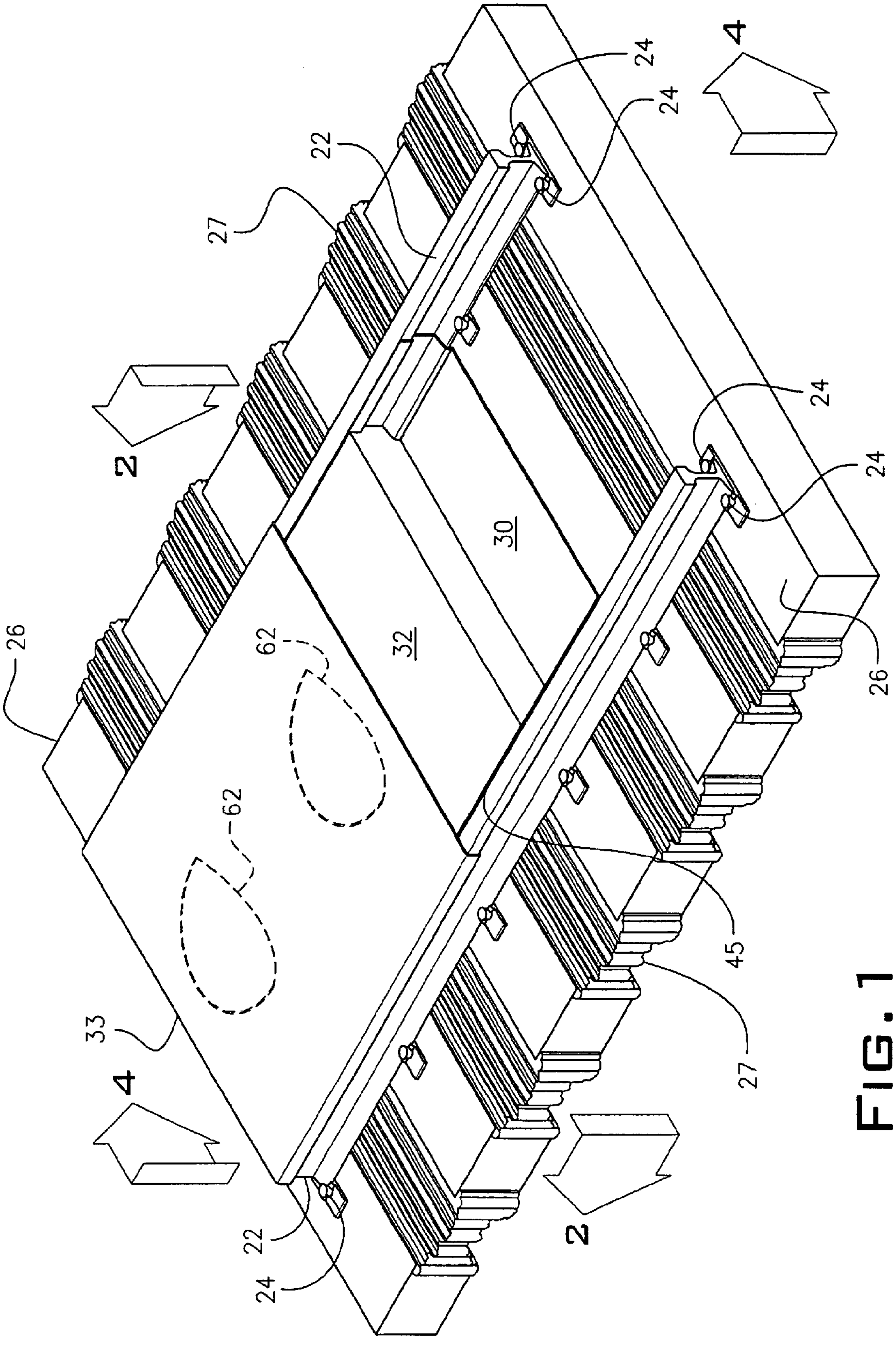
FIG. 1 is a perspective view, partially in section, of a continuously moving sidewalk pedestrian transport system of the present invention.

Throughout the following detailed description, the same reference numerals refer to the same elements in all figures.

Figure 5:
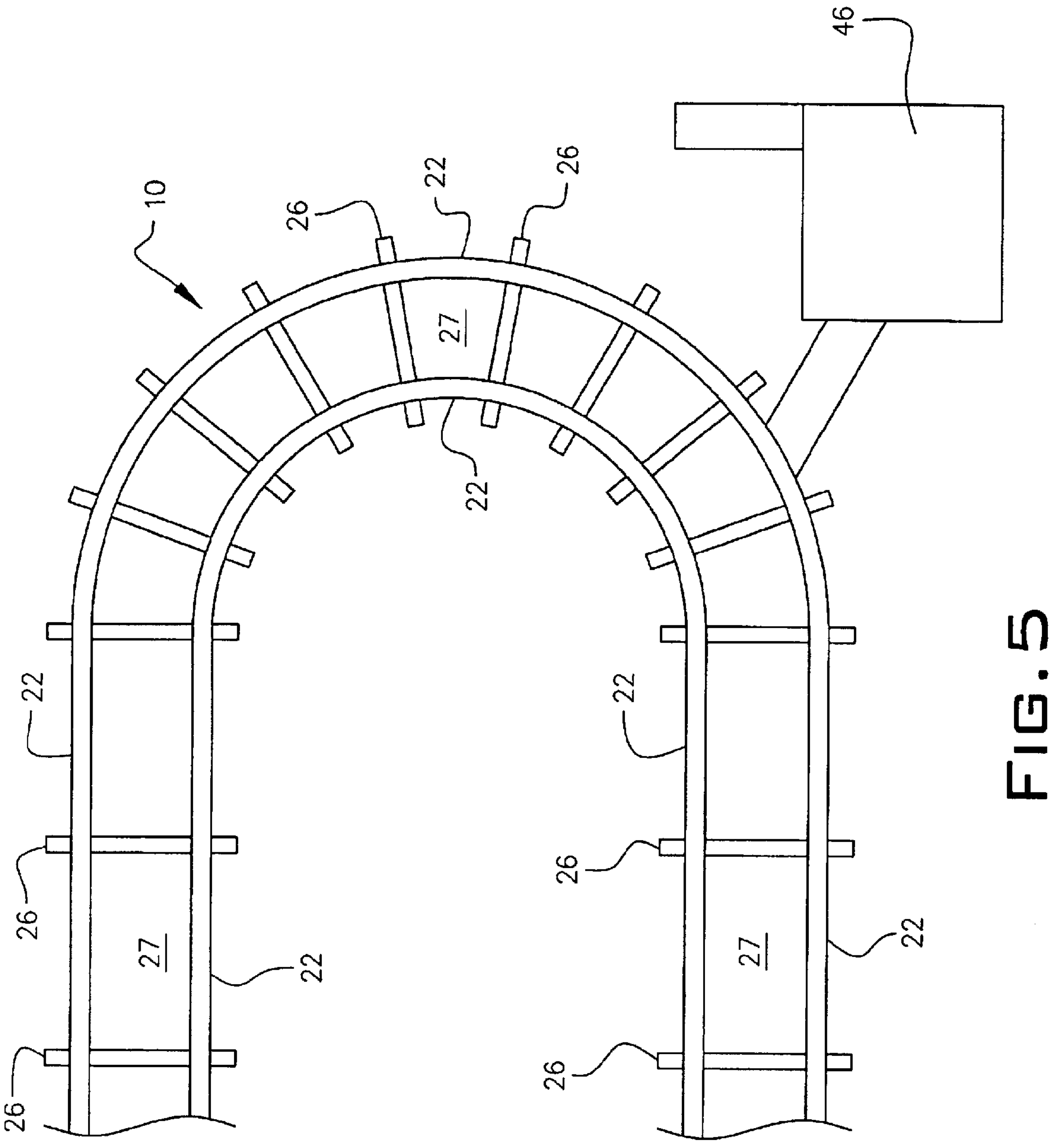
FIG. 5 is a top plan view, partially in section, of the continuously moving sidewalk pedestrian transport system of the present invention wherein it is shown that the system is a loop and can be powered electrically or hydraulically by a substation along the loop.

Referring to FIG. 5, a continuously moving sidewalk pedestrian transport system of the present invention is shown. The transport system utilizes a locomotive railway loop 10 that is separated from any existing railway lines in a residential community where pedestrians can easily access the sidewalk from their homes and travel upon it to shopping locations, community parks, workplaces and other transportation stations, to just name a few.

With reference to FIG. 1, each transport system is constructed with an existing locomotive railway line or a newly constructed line having steel rails 22 mounted to cross ties 26 with nails 24 (see FIGS. 1, 2 and 5) set either within in a stone gravel bed 27 or laid thereupon. The present invention utilizes an area between the pair of steel rails 22 such that it is sealed for the entire railway loop 10.

Figure 2:
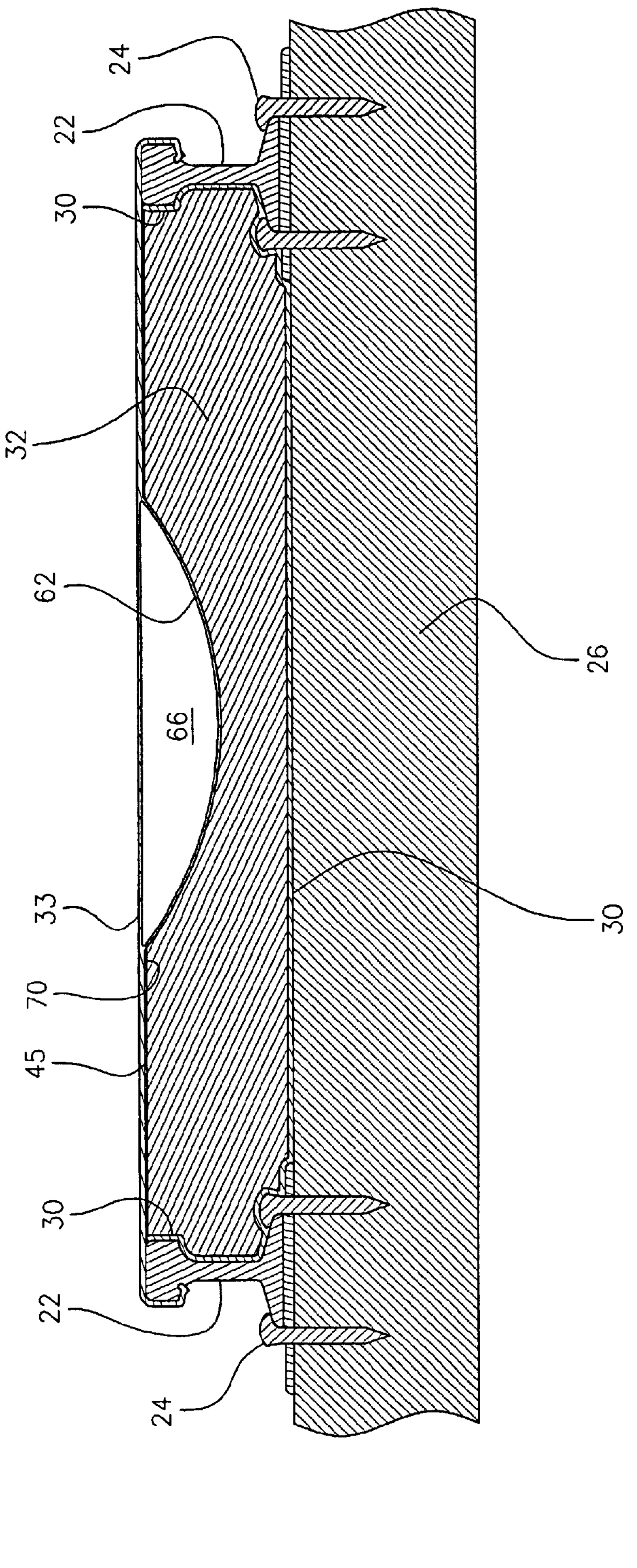
FIG. 2 is a cross sectional view along lines 2—2 of FIG. 1.

Referring to FIGS. 1 and 2, a pathway 33 is suspended between the pair of steel rails 22 upon a fluid 32 retained within the area between the steel rails 22 encompassing the entire railway loop 10. Fluid 32 is retained within the area and is prevented from leaking by employing a natural or man-made sealant 30. Examples of man-made sealants that can be used include, but are not limited to, various types of polymers or acrylic. Examples of natural sealants that can be used include, but are not limited to, various metals or clay soil.

Referring now back to FIG. 5, it is shown that a power source 46 sustains a constant pressure for the fluid 32 (not shown in FIG. 3) through a pump (not shown) retained between the pair of steel rails 22. The pathway 33 (shown in FIGS. 1 and 2) is moved along a top portion 45 of the sealed area between the steel rails 22 by the power source 46 at a constant speed suitable for pedestrians to ride for easy access to any locations along railroad loop 10.

Figure 3:
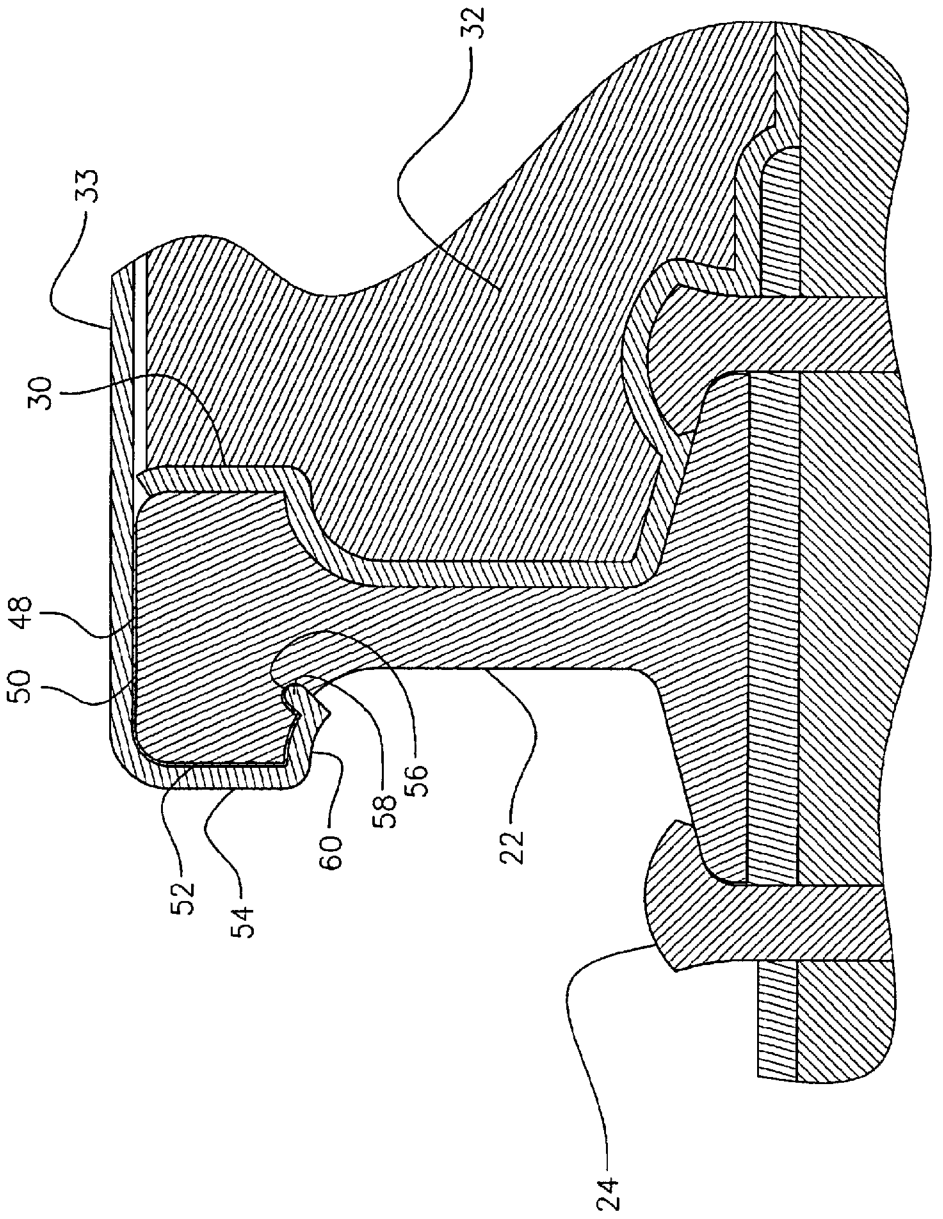
FIG. 3 is a close-up cross sectional view taken from FIG. 2.

Referring to FIG. 3, a close-up view taken from FIG. 2, it is shown that pathway loop 33 wraps around each steel rail 22 at opposed ends. In particular, opposed outer distal edges 54 of pathway loop 33 wrap over a top surface 50 and around an outer side edge 52 of rail 22. Pathway 33 further includes a bottom edge 54 having an integrally attached bead member 58 for engaging and communicating with a groove 56 formed in rail 22. Grease 48 is applied between rail top surface 50 and outer side surface 52 and pathway 33 for assisting in the water tight seal as well as assisting in the movement of pathway 33 along the direction of the water flow.

Figure 4:
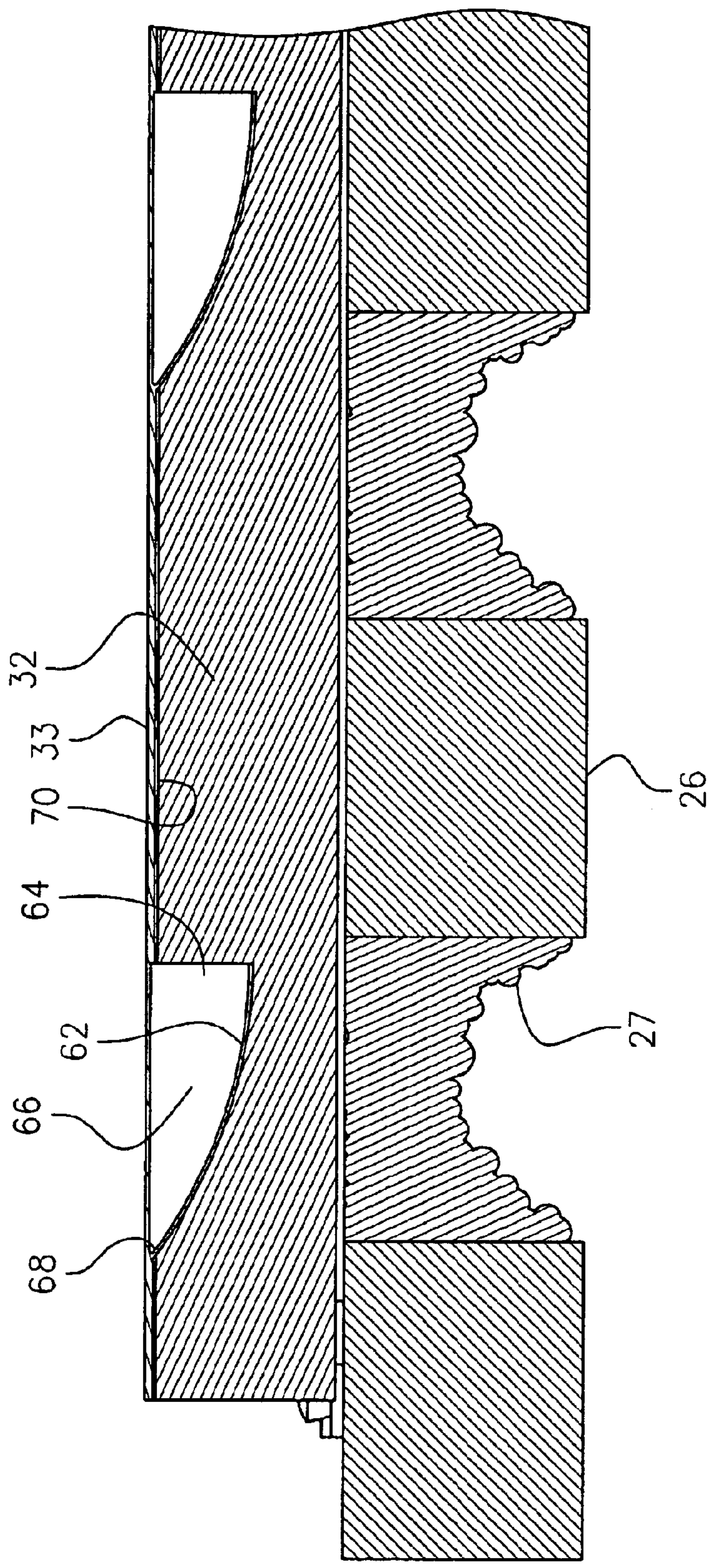
FIG. 4 is a cross sectional view along lines 4—4 of FIG. 1.

As shown in FIG. 4, a plurality of downwardly extending spaced cup portions 62 are formed along a bottom surface 70 of pathway loop 33. Cup portions 62 assist in the movement of pathway loop 33 by catching and retaining fluid 32 from the fluid flow within a cavity 66. Cup portions 62 have an open front end 64 and a closed back end 68 which define cavity 66. In the preferred embodiment, cup portions 62 are formed by cutting a small slice into pathway loop bottom surface 70 which allows fluid 32 to "bow" out cup potion 62. However, an alternate embodiment includes forming integrally attached cup portions 62 along the pathway loop bottom surface 70 by molding.

An alternate embodiment of the present invention provides for a magnetic levitation effect between the continuous pathway 33 and steel rails 22 suitable for the pedestrians to efficiently move within their local community. This embodiment does not require grease as the outer distal edges 54 of pathway loop 33 is held away by a slight margin by a magnetic filed.

Equivalent elements can be substituted for the ones set forth above such that they perform the same function in the same manner thereby achieving the same result.

What is claimed is:

1. A continuously moving sidewalk pedestrian transport system, comprising:

a) a continuous railway loop having a plurality of spaced elongated tie rods connecting a pair of continuous parallel rails, the parallel rails having top, inner and outer side surfaces and a groove formed along a lower portion of each rail outer side surface, the continuous railway loop positioned on a ground surface bed;

b) a sidewalk pathway mounted over the pair of continuous parallel rails for supporting pedestrian traffic, the sidewalk pathway having a top and bottom surface, opposed outer distal edges and a bottom edge of each opposed outer distal edge, each bottom edge having a bead formed thereon for engaging and communicating with the groove of the rail;

c) an enclosed area defined below the sidewalk pathway bottom surface, above the top surface of the ground surface bed and between the parallel rail inner side surfaces;

d) a hydraulic seal disposed along a bottom portion of the enclosed area over the surface bed top surface and along the parallel rail inner surfaces;

e) a fluid retained in the enclosed area between the hydraulic seal and the sidewalk pathway bottom surface;

f) a fluid pump communicating with the fluid retained in the enclosed area providing a constant pressure to the fluid creating a fluid flow; and g) a power source providing an electrical source to the fluid pump.

2. The pedestrian transport system of claim 1, further comprising a plurality of downwardly extending cup portions formed along the sidewalk pathway bottom surface, each cup portion having an open front end, a closed back end and a cavity formed therein, the cup portions permitting fluid to enter the cavity to assist in the movement of the sidewalk pathway along the fluid flow.

3. The pedestrian transport system of claim 1, wherein the ground surface bed is stone gravel.

4. The pedestrian transport system of claim 3, wherein the plurality of elongated ties rods are embedded in the stone gravel.

5. The pedestrian transport system of claim 1, further comprising a lubricant disposed between the sidewalk pathway bottom surface at the opposed outer distal and bottom edges and the rail top and outer side surfaces.

6. The pedestrian transport system of claim 5, wherein the lubricant is chosen from the group consisting of grease, petroleum and silicone.

7. The pedestrian transport system of claim 1, wherein each bead is integrally formed along a distal end of the opposed outer distal edge bottom edges.

8. The pedestrian transport system of claim 7, wherein each bead extends inwardly at an angle from the opposed outer distal edge bottom edges to engage and communicate with the rail grooves.

9. The pedestrian transport system of claim 1, wherein the hydraulic seal is continuous.

10. The pedestrian transport system of claim 1, wherein the hydraulic seal is formed by employing a sealant in the enclosed area, the sealant chosen from the group consisting of polymers, acrylic, metal and clay soil.

11. The pedestrian transport system of claim 1, wherein the fluid retained in the enclosed area has a level which does not exceed a height of each rail.

12. The pedestrian transport system of claim 1, wherein the continuous parallel rails are attached to the plurality of elongated ties by nails.

13. A continuously moving sidewalk pedestrian transport system, comprising:

a) a continuous railway loop having a plurality of spaced elongated tie rods connecting a pair of continuous parallel rails, the parallel rails having top, inner and outer side surfaces and a groove formed along a lower portion of each rail outer side surface, the continuous railway loop positioned on a ground surface bed and located within a residential community for permitting pedestrians to position themselves upon the loop and move from one location in the community to a multitude of other locations therewithin;

b) a sidewalk pathway mounted over the pair of continuous parallel rails for supporting the pedestrians, the sidewalk pathway having a top and bottom surface, opposed outer distal edges and a bottom edge of each opposed outer distal edge, each bottom edge having a bead formed along a distal end inwardly extending therefrom for engaging and communicating with the groove of the rail;

c) a lubricant disposed intermediate the pathway bottom surface at the opposed outer distal and bottom edges and the rail top and outer side surfaces;

d) a fluid retaining enclosed area defined below the sidewalk pathway bottom surface, above the top surface of the ground surface bed and between the parallel rail inner side surfaces;

e) a hydraulic seal disposed along a bottom portion of the enclosed area over the surface bed top surface and along the parallel rail inner surfaces;

f) a fluid retained in the enclosed area between the hydraulic seal and the sidewalk pathway bottom surface;

g) a fluid pump communicating with the fluid retained in the enclosed area providing a constant pressure to the fluid creating a fluid flow; and h) a power source providing an electrical source to the fluid pump.

14. The pedestrian transport system of claim 13, further comprising a plurality of downwardly extending cup portions formed along the sidewalk pathway bottom surface, each cup portion having an open front end, a closed back end and a cavity formed therein, the cup portions permitting fluid to enter the cavity to assist in the movement of the sidewalk pathway along the fluid flow.

15. The pedestrian transport system of claim 14, wherein the downwardly extending cup portions are formed by cutting a slit into the sidewalk pathway bottom surface.

16. The pedestrian transport system of claim 13, further comprising a multitude of nails for attaching the pair of continuous parallel rails to the plurality of spaced elongated tie rods.

17. The pedestrian transport system of claim 13, wherein the lubricant is chosen from the group consisting of grease, petroleum and silicone.

18. The pedestrian transport system of claim 13, wherein the hydraulic seal is continuous.

19. The pedestrian transport system of claim 18, wherein the continuous hydraulic seal is formed by employing a sealant in the enclosed area, the sealant chosen from the group consisting of polymers, acrylic, metal and clay soil.

20. The pedestrian transport system of claim 13, wherein the fluid retained in the enclosed area has a level which does not exceed a height of each rail.

* * * * *